July 10, 1951          C. G. DEWEY          2,560,217
GROUNDED PHASE SELECTOR
Filed April 29, 1948                    2 Sheets-Sheet 1

Inventor:
Clyde G. Dewey,
by Ernest C. Britton
His Attorney.

July 10, 1951 C. G. DEWEY 2,560,217
GROUNDED PHASE SELECTOR
Filed April 29, 1948 2 Sheets-Sheet 2

Inventor:
Clyde G. Dewey,
by Ernest C. Britton
His Attorney.

Patented July 10, 1951

2,560,217

UNITED STATES PATENT OFFICE 2,560,217

GROUNDED PHASE SELECTOR

Clyde G. Dewey, Philadelphia, Pa., assignor to General Electric Company, a corporation of New York Application April 29, 1948, Serial No. 24,041

3 Claims. (Cl. 175—294)

My invention relates generally to protective systems and in particular to ground fault protective systems for polyphase alternating current circuits employing single pole circuit breakers. More specifically, my invention enables electroresponsive means of a reversible torque wattmetric type to select the faulted phase for tripping the single pole circuit breaker associated with such phase.

Where two power systems or two portions of the same system are connected together by a polyphase tie line, it has been found desirable to de-energize only the faulted conductor when a ground fault occurs thereby leaving the remaining conductors energized to maintain a condition of relatively stable synchronism between the two systems or portions thereof.

Under certain conditions, single pole switching is desirable where energy is being supplied through a polyphase transmission line to synchronous machinery because de-energizing only the faulted conductor improves the chances for the synchronous machinery connected to the system as a load to maintain synchronism for a short time at least.

Accordingly, it is a principal object of my invention to provide improved reversible torque wattmetric grounded phase selectors for a polyphase alternating current circuit which will function to select only the phase conductor upon which a ground fault occurs.

Another object of my invention is to provide an improved protective system capable of single pole switching in response to single phase to ground faults and which is also capable of affording supplementary protection to the system when two or more phases are short circuited to ground by de-energizing the two or more shorted phases.

Still another object of my invention is the provision of an improved protective system for polyphase alternating current circuits which is adapted for single pole fault responsive tripping and which will function to de-energize the faulted phases when two or more phases are short circuited to ground even though the voltage triangle representing the line-to-line voltages is completely collapsed.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawings in which Figs. 1, 1a, 2, 2a, 3, 3a, 4, 4a, 5, 5a, 6, 6a, 7, 7a, 8, and 8a are vector diagrams to aid in understanding the principles involved in the operation of my invention; Fig. 9 is a diagrammatic representation of a protective system embodying my invention as applied to a polyphase alternating current circuit and Fig. 10 is a diagrammatic representation of a modification of a portion of the arrangement shown in Fig. 9.

The numerals 1, 2, and 3 wherever they appear on the drawings except as designation for Figs. 1, 2, and 3 relate to the three phases of a three-phase alternating current circuit.

In Fig. 1 the line 1—2 represents the voltage between phases 1 and 2; the line 2—3 represents the voltage between phases 2 and 3 and the line 3—1 represents the voltage between phases 3 and 1. Figure 1 represents the normal operating condition of the circuit when none of the phases is faulted. Figure 1a is identical to Fig. 1 except that the various phase voltage are rearranged and are designated by $E_{1-2}$, $E_{3-1}$, and $E_{2-3}$.

Figure 9:
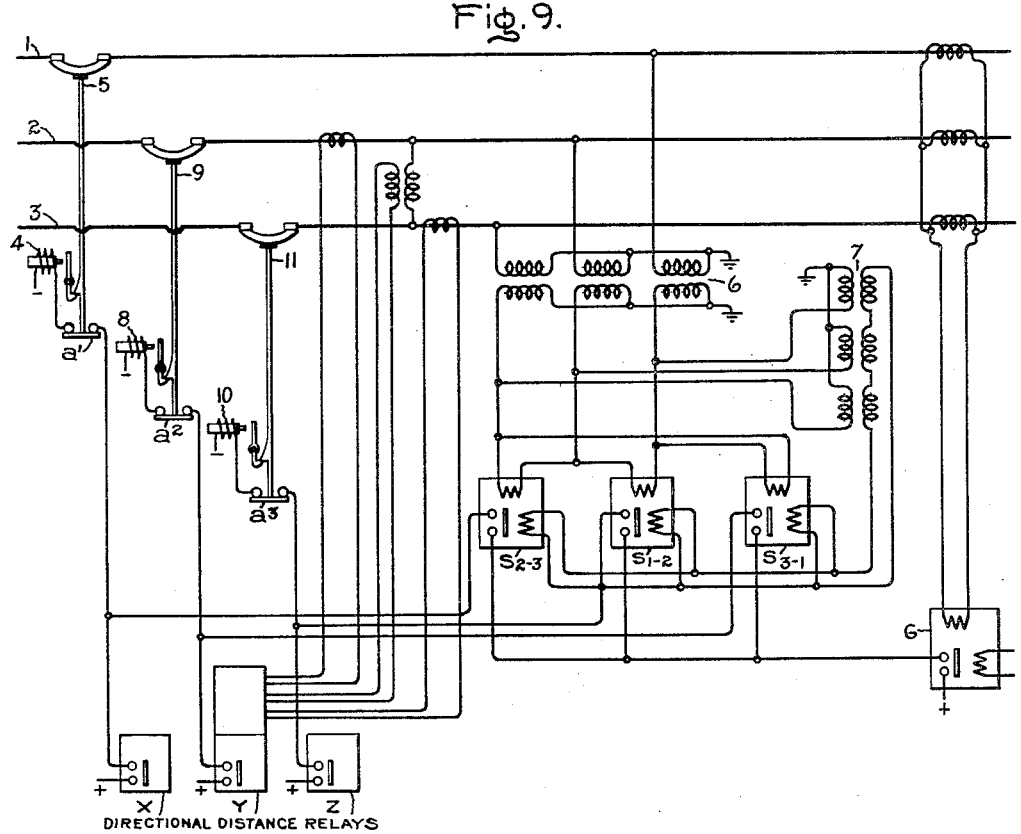

In accordance with my invention, I provide ground selector units of the reversible torque wattmetric type, such as $S_{2-3}$, $S_{1-2}$, and $S_{3-1}$, diagrammatically represented in Fig. 9 which are constructed to operate a movable element in the direction for tripping the associated circuit breaker, such as the movable contact shown, by wattmetric means illustrated schematically as provided with one coil which is responsive to the particular preselected line-to-line voltage and another coil which is responsive to the residual voltages $E_R$. As demonstrated hereinafter, the residual voltage $E_R$ has a different phase relationship with respect to each line-to-line voltage upon a separate fault to ground of each phase conductor in the circuit and this enables each improved grounded phase selector unit of the present invention to operate independently of each other. The reversible torque wattmetric selector units, such as $S_{2-3}$, inherently producing a torque that is proportional to the product of the two energizing voltages and a function of the phase angle or phase relationship therebetween and may conveniently be constructed to develop maximum operating torque in the tripping direction when the residual voltage $E_R$ leads the line-to-line voltage by an angle of approximately 105°. These selectors could be physically constructed in a manner similar to the units disclosed in U. S. Patent 2,110,655—Bancker, granted March 8, 1938, and assigned to the assignee of this application. Suitable circuit constants would be chosen to insure that maximum torque would be developed by the selectors when the particular line-to-line voltage and the residual voltage are displaced from each other by the desired angle. Thus with reference to Fig. 2a, maximum torque would be developed by the selector unit $S_{2-3}$, when residual voltage $E_R$ is disposed by an angle of 105° with respect to the dotted line $o—y$ which line represents an imaginary line-to-line voltage. Otherwise stated, the various selector units would have tripping torque characteristics limited to a predetermined range of phase relationships indicated by the reference line $b—b^1$ which reference line would be disposed with respect to the voltage $E_R$ by an angle of 15°. Thus only line voltage to the right of the line $b—b^1$, such as the voltage $E_{2-3}$, in conjunction with the voltage $E_R$, would cause the ground selector unit $S_{2-3}$ to operate in the tripping direction since the torque developed therein would be in the opposite direction. It will be understood from Fig. 2a that, when lines 2 and 3 are not grounded, the voltages $E_{1-2}$ and $E_{3-1}$ would not be within an effective tripping range of phase relationships with respect to the residual voltage and the selector units $S_{1-2}$ and $S_{3-1}$ would not operate in the tripping direction.

With reference to Fig. 9 and in view of the above, it will be understood that a fault between line 1 and ground would cause the selector unit $S_{2-3}$ to close its contacts and, if the fault is in the direction for which tripping is desired, the ground directional relay G would also close its contacts and a circuit would be completed through the normally closed switch $a^1$ to the trip coil 4 which coil in turn would trip the circuit breaker 5, thereby de-energizing line 1. It is clear from Fig. 9 that the line-to-line voltages are supplied to the various selectors through the Y-connected transformer 6 and that the residual voltage $E_R$ is supplied to the selector units by the potential transformer 7, the primary of which is Y-connected and the secondary of which is arranged as an open delta.

Figure 3:
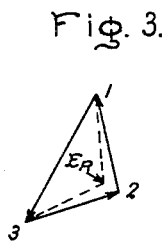

Figure 3 is a vectorial representation of the various quantities when line 2 is short circuited to ground while lines 1 and 3 are not short circuited.

Figure 2A:
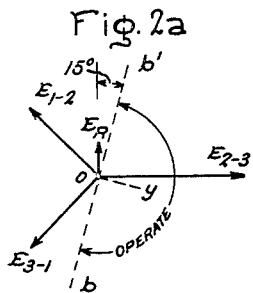
Figure 2a is a vectorial representation of the voltage triangle of Fig. 2 showing the phase-to-phase voltages and the residual voltage in the same angular relationships one to the other as are shown in Fig. 2.
Figure 3A:
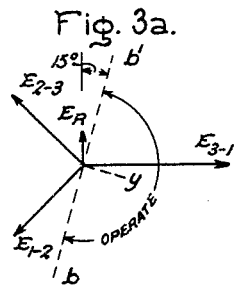

Figure 3a is a vectorial representation of the various quantities shown in Fig. 3 with the vectors rotated counterclockwise by some angle in excess of approximately 120° so that the vector $E_R$ is vertical for the sake of uniformity and for convenience in reading the figures. From the above explanation relating to Fig. 2a, it will readily be seen that the voltage $E_{3-1}$ in Fig. 3a is within the tripping phase relationship operating range and that selector unit $S_{3-1}$ will close its contacts when line 2 is short circuited to ground, and from Fig. 9 it can readily be seen that a circuit through the ground directional relay G, the contacts of the selector unit $S_{3-1}$, and the switch $a^2$ will be completed to the trip coil 8 of circuit breaker 9. Energization of trip coil 8 will open circuit breaker 9 thereby causing line 2 to be de-energized.

Figure 2:
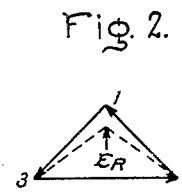
Figure 2 is similar to Fig. 1 except that in Fig. 2 the various vectors represents the phase-to-phase voltages when the conductor for phase 1 is short circuited to ground. It will be observed that a residual voltage $E_R$ is shown on the diagram of Fig. 2 which vector, in a sense, is representative of the unbalanced condition of the polyphase circuit when line 1 is short circuited to ground.
Figure 4:
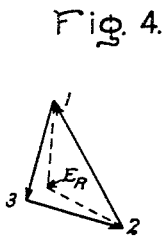

Figure 4 is a vectorial representation similar to Figs. 2 and 3 and which represents the various quantities when line 3 is short circuited to ground.

Figure 4A:
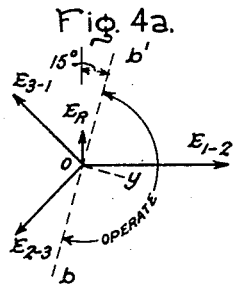

Figure 4a is a vectorial representation similar to Figs. 2a and 3a which shows that, when line 3 is short circuited to ground, the voltage $E_{1-2}$ together with the voltage $E_R$ will be effective to develop torque in the tripping direction and thereby operate the selector unit $S_{1-2}$ shown in Fig. 9. Operation of selector $S_{1-2}$ and of ground relay G will energize trip coil 10 associated with circuit breaker 11 through the switch $a^3$ and will thus trip the circuit breaker 11 thereby de-energizing conductor 3.

Figure 1:
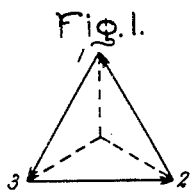
Figure 1A:
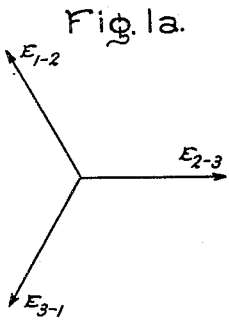
Figure 5:
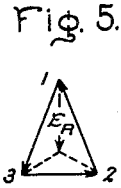

Figure 5 shows vectorially the line-to-line voltages and the residual voltage in their proper relationship one to the other for a short circuit between lines 2 and 3 and ground.

Figure 5A:
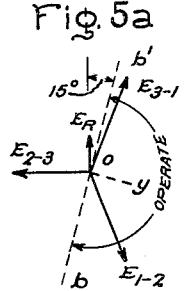

Figure 5a shows vectorially the quantities shown in Fig. 5 with the vectors rotated through an angle of approximately 180° so that the vector $E_R$ is vertical and also, superimposed thereon, the operating reference characteristic line $b—b^1$ of the selector units as well as the dotted line $o—y$ which represents an imaginary line-to-line voltage which together with residual voltage $E_R$ would produce maximum operating torque in the tripping direction in the selector units. From Fig. 5a it is clear that the voltages $E_{3-1}$ and $E_{1-2}$ are within the operating range of phase relationships for their respective selectors. From Fig. 9 it will be seen that operation of selector units $S_{1-2}$ and $S_{3-1}$ together with the operation of relay G will energize trip coils 8 and 10 respectively thereby opening circuit breakers 9 and 11 and de-energizing lines 2 and 3 which, as indicated in Figs. 5 and 5a, are short circuited to ground.

Figure 6:
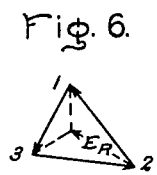

Figure 6 represents vectorially the various quantities when a short circuit to ground occurs in which lines 1 and 3 are involved.

Figure 6A:
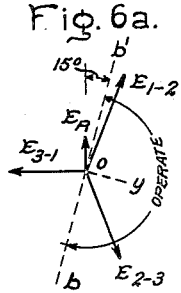

Figure 6a is similar to the diagram of 5a with the quantities of Fig. 6 rotated clockwise through an angle of approximately 60° so that the vector $E_R$ is vertical. From Fig. 6a and from the above explanation in connection with Fig. 5a, it will be seen that voltages $E_{1-2}$ and $E_{2-3}$ are within the operating range of selector units $S_{1-2}$ and $S_{2-3}$. When selectors $S_{1-2}$ and $S_{2-3}$ and the relay G operate, circuits will be completed to coils 10 and 4 respectively which coils will trip circuit breakers 11 and 5 thereby opening conductors 1 and 3 which, as indicated in Figs. 6 and 6a, would be short circuited to ground.

Figure 7:
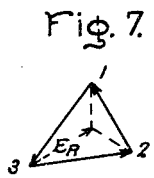

Figure 7 is a vector diagram similar to Figs. 5 and 6 and represents the quantities when lines 1 and 2 are short circuited to ground.

Figure 7A:
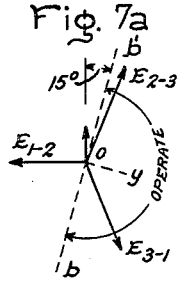

Figure 7a is a vector diagram similar to Figs. 5a and 6a with the quantities shown in Fig. 7 rotated counterclockwise by an angle of approximately 60° so as to have the vector $E_R$ occupy the vertical position. From Fig. 7a it will be understood that the voltages $E_{2-3}$ and $E_{3-1}$ are within operating range of the selector units and that units $S_{2-3}$ and $S_{3-1}$ will operate together with relay G to energize trip coils 4 and 8 respectively thereby de-energizing lines 1 and 2 which, as indicated in Figs. 7 and 7a, are the lines which would be short circuited to ground.

The selector units $S_{2-3}$, $S_{1-2}$, and $S_{3-1}$ are not directional and hence the purpose of the ground directional relay is to provide directional characteristics to the protective system illustrated in the drawing and which embodies my invention.

Figure 8:
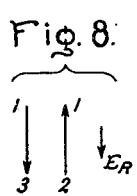

Figure 8 is a vector diagram similar to Fig. 5 but which represents the various quantities when lines 2 and 3 are short circuited to ground at a point very close to the point of connection of the ground selector units and of the ground relay G to the system. Otherwise stated, Fig. 8 represents a completely collapsed voltage triangle wherein no appreciable voltage exists between lines 2 and 3 and wherein the line-to-line voltages 3—1 and 1—2 are 180° out of phase.

Figure 8A:
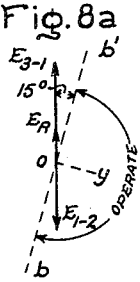

Figure 8a represents the quantities shown in Fig. 8 except that the vectors have been rotated through an angle of approximately 180° to place the $E_R$ vector in the vertical position. Figure 8a shows that the voltage $E_{1-2}$ is within operating range and that selector $S_{1-2}$ of Fig. 9 would operate in conjunction with relay G to open phase 3 by energizing the trip coil 10 of circuit breaker 11. Figure 8a also shows that the voltage $E_{3-1}$ is not within the operating range of the selector unit 3—1 and this unit, therefore, will not operate under collapsed voltage triangle conditions to open circuit breaker 9. For this reason it is desirable to provide other means for opening phase conductor 2 whenever a condition such as that described above occurs. For this purpose any suitable known arrangement could be provided. Preferably the relay Y is of the directional distance type and is provided with a voltage coil responsive to voltage between conductors 2 and 3, a current coil responsive to current in conductor 2, and a current coil responsive to current in conductor 3. Thus, relay Y is adapted to operate on a phase-to-phase fault between conductors 2 and 3. The condition represented by Figs. 8 and 8a would cause a phase-to-phase disturbance to occur between these two conductors which would activate relay Y to cause this relay to energize coil 8 and thereby to open circuit breaker 9 which operation would de-energize phase 2. Thus by means of relay Y, phase 2 is opened when the voltage triangle, as shown in Fig. 8, completely collapses.

By means of vector diagrams, such as Figs. 8 and 8a, it could be shown that, when the voltage triangle is completely collapsed, phase 1 would fail to open under certain conditions similar to those represented in Figs. 8 and 8a and, furthermore, that conductor 3 would not be de-energized under certain other conditions similar to those represented by Figs. 8 and 8a. To meet these conditions, relays such as X and Z could be provided which would be similar to relay Y. For purposes of simplicity in the drawing, I have omitted from the drawing the current and voltage connections to the relays X and Z for the reason that such connections are well known in the art and would correspond to the connection shown in connection with relay Y.

From the above description, it can be seen that the relays X, Y, and Z will operate to open appropriate circuit breakers whenever any two phases are involved in a phase-to-phase fault or in a phase-to-phase fault involving ground and that the realys X, Y, and Z would operate to open all the circuit breakers in all of the phases when a phase-to-phase fault occurred involving all phases or when a phase-to-phase to ground fault occurred involving all phases. It follows then that the operation of the selector units on a two phase to ground fault is supplementary protection only and that the principal purpose of my invention is to provide automatically operable means for de-energizing a single phase when such phase is short circuited to ground.

While in the embodiment of my invention shown in Fig. 9 I have energized one of the phase windings of each of the selector units $S_{1-2}$, $S_{3-1}$, and $S_{2-3}$ with a current dependent upon the presence of a ground fault on the polyphase circuit connecting them to the open delta secondary winding of the transformer 7, it will be obvious to those skilled in the art that these phase windings may be connected to the polyphase circuit in any well-known manner so as to accomplish this result.

Figure 10:
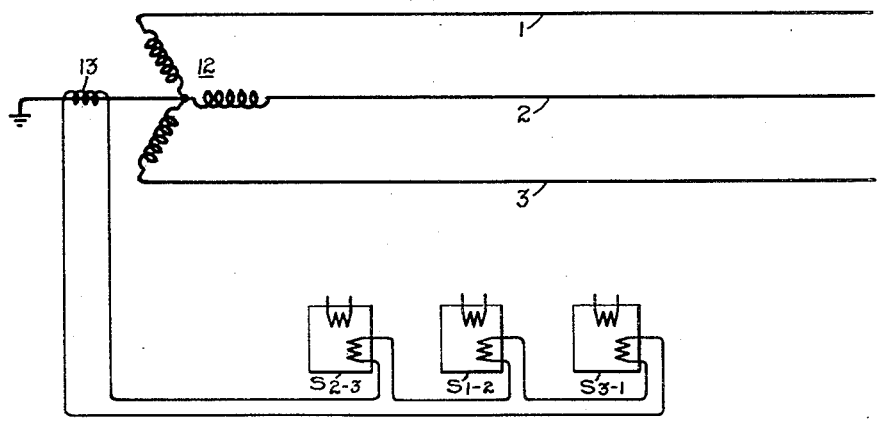

Figure 10 represents an alternative arrangement whereby the current in the grounded neutral of a Y-connected power transformer connected to lines 1, 2, and 3, is utilized instead of the residual voltage as in Fig. 9 to operate the selector units $S_{1-2}$, $S_{2-3}$, and $S_{3-1}$. In Fig. 10 the numeral 12 represents the primary or secondary winding of a power transformer. The numeral 13 represents a current transformer for supplying energy to the coils of each of the selector units energized by residual voltage from the transformer 7 in Fig. 9 when a ground fault occurs. In Fig. 10 these coils of the selectors are connected in series circuit relationship rather than in parallel circuit relationship as in Fig. 9. The current in transformer 13 will be displaced from the voltages from transformer 7 somewhat so that the selector units of Fig. 10 would necessarily have to be designed to develop maximum torque at some predetermined angle other than 105° as in the arrangement shown in Fig. 9.

It will be obvious that, instead of the current transformer 13, a potential transformer could be used provided a suitable impedance were located in the line connecting the transformer neutral to ground. Such a potential transformer would, of course, be connected across the ground impedance and would energize the selector units during the occurrence of a ground fault. In the arrangement utilizing a potential transformer it would be desirable under most conditions to connect the coils of the selector units in parallel as in Fig. 9 rather than in series as in Fig. 10.

Thus, it will be seen that a fault to ground will cause a disturbance in the system which in turn makes possible the utilization of the residual voltage in an arrangement such as Fig. 9 or the flow of current to ground from the neutral of a Y-connected transformer as shown in Fig. 10 for the purpose of selecting and tripping the faulted phase or phases in accordance with predetermined phase relationships between preselected line-to-line voltages and such residual voltage or the current to ground from the neutral of a power transformer.

While I have shown and described particular embodiments of my invention, it will be obvious to those skilled in the art that various changes and modifications may be made without departing from my invention in its broader aspects and I, therefore, intend in the appended claims to cover all such changes and modifications as fall within the true spirit and scope of my invention.

What I claim as new and desire to secure by Letters Patent of the United States is:

1. A grounded phase selector for a three-phase circuit having in combination a separate movable ground indicating induction element for each corresponding phase conductor of the circuit, a separate wattmetric operating device for each element having two windings for jointly producing a reversible inductive force to move the element either in its ground indicating direction or in the opposite direction dependent upon the relative energization of the windings, means for energizing one winding of each device in accordance with the line-to-line voltage between the two other phase conductors of the circuit, means for energizing the other winding of each device in accordance with the residual voltage upon the occurrence of a single line-to-ground fault of any phase conductor of the circuit, and each device having the two windings thereof electromagnetically related with the induction element to produce the inductive force in the direction to move the element in its ground indicating direction only when the line-to-line voltage energization of the one winding thereof is within a predetermined range of phase relations with respect to the residual voltage energization of the other winding thereof which range includes all the phase relations resulting from a single line-to-ground fault of the corresponding phase conductor and to produce the inductive force in the opposite direction upon any single line-to-ground fault of either of the other two phase conductors.

2. A grounded phase selector for a three-phase circuit having in combination a separate movable ground indicating induction element for each corresponding phase conductor of the circuit, a separate wattmetric operating device for each element having two windings for jointly producing a reversible inductive force to move the element either in its ground indicating direction or in the opposite direction dependent upon the relative energization of the windings, means for energizing one winding of each device in accordance with the line-to-line voltage between the two other phase conductors of the circuit, means for energizing the other winding of each device in accordance with the residual voltage upon the occurrence of a single line-to-ground fault of any phase conductor of said circuit, and each device having the two windings thereof electromagnetically related with the induction element to produce the inductive force in the direction to move the element in its ground indicating direction only when the line-to-line voltage energization of the one winding thereof is within a predetermined range of phase relations with respect to the residual voltage energization of the other winding thereof which range includes all the phase relations resulting from a single line-to-ground fault of the corresponding phase conductor and also includes the phase relations resulting from a double line-to-ground fault of the said corresponding phase conductor and either one of the other conductors as long as a substantial voltage is maintained therebetween, and to produce the inductive force in the opposite direction upon any single line-to-ground fault of either of the other two phase conductors.

3. A grounded phase selector for a three-phase circuit having in combination a separate movable ground indicating induction element for each corresponding phase conductor of the circuit, a separate wattmetric operating device for each element having two windings for jointly producing a reversible inductive force to move the element either in its ground indicating direction or in the opposite direction dependent upon the relative energization of the windings, means for energizing one winding of each device in accordance with the line-to-line voltage between the two other phase conductors of the circuit, means for energizing the other winding of each device in accordance with the residual voltage upon the occurrence of a single line-to-ground fault of any phase conductor of the circuit, and each device having the two windings thereof electro-magnetically related with the induction element to produce the inductive force in the direction to move the element in its ground indicating direction only when the line-to-line voltage energization of the one winding thereof is within a predetermined range of phase relations with respect to the residual voltage energization of the other winding thereof which range includes all the phase relations resulting from a single line-to-ground fault of the corresponding phase conductor and also includes the phase relations resulting from a collapse of the voltage triangle upon a double line-to-ground fault of the said corresponding conductor and a predetermined one of the other conductors and to produce the inductive force in the opposite direction upon any single line-to-ground fault of either of the other two phase conductors.

CLYDE G. DEWEY.

REFERENCES CITED

The following references are of record in the file of this patent:

UNITED STATES PATENTS

| Number | Name | Date |
| --- | --- | --- |
| 1,535,589 | Evans | Apr. 28, 1925 |
| 1,731,372 | Crichton | Oct. 15, 1929 |
| 2,161,829 | Lenehan | June 13, 1939 |
| 2,320,861 | Goldsborough | June 1, 1943 |
| 2,365,025 | Traver et al. | Dec. 12, 1944 |
| 2,381,282 | Harder | Aug. 7, 1945 |
| 2,403,414 | Traver | July 2, 1946 |
| 2,445,429 | Goldsborough | July 20, 1948 |

FOREIGN PATENTS

| Number | Country | Date |
| --- | --- | --- |
| 479,788 | Germany | July 22, 1929 |
| 752,537 | France | July 24, 1933 |